(No Model.)  5 Sheets—Sheet 2.

T. HENNESSY.
GAS GENERATOR.

No. 573,183.  Patented Dec. 15, 1896.

Witnesses,
Chas. W. Parker,
B. C. Tiffany

Inventor,
Thomas Hennessy
per Fred E. Tasker,
Atty.

(No Model.) 5 Sheets—Sheet 3.
T. HENNESSY.
GAS GENERATOR.

No. 573,183. Patented Dec. 15, 1896.

Witnesses,
Chas. W. Parker.
B. C. Tiffany

Inventor:
Thomas Hennessy
per Fred B. Packer,
Atty.

(No Model.) 5 Sheets—Sheet 4.
T. HENNESSY.
GAS GENERATOR.
No. 573,183. Patented Dec. 15, 1896.
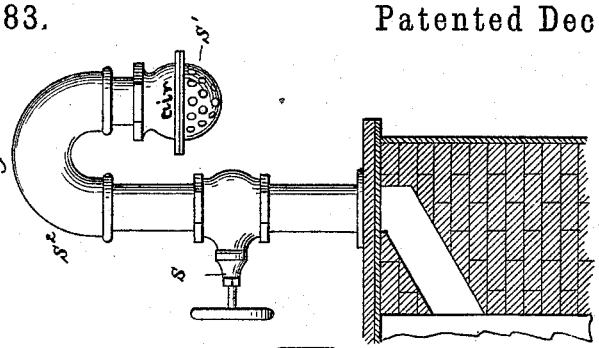
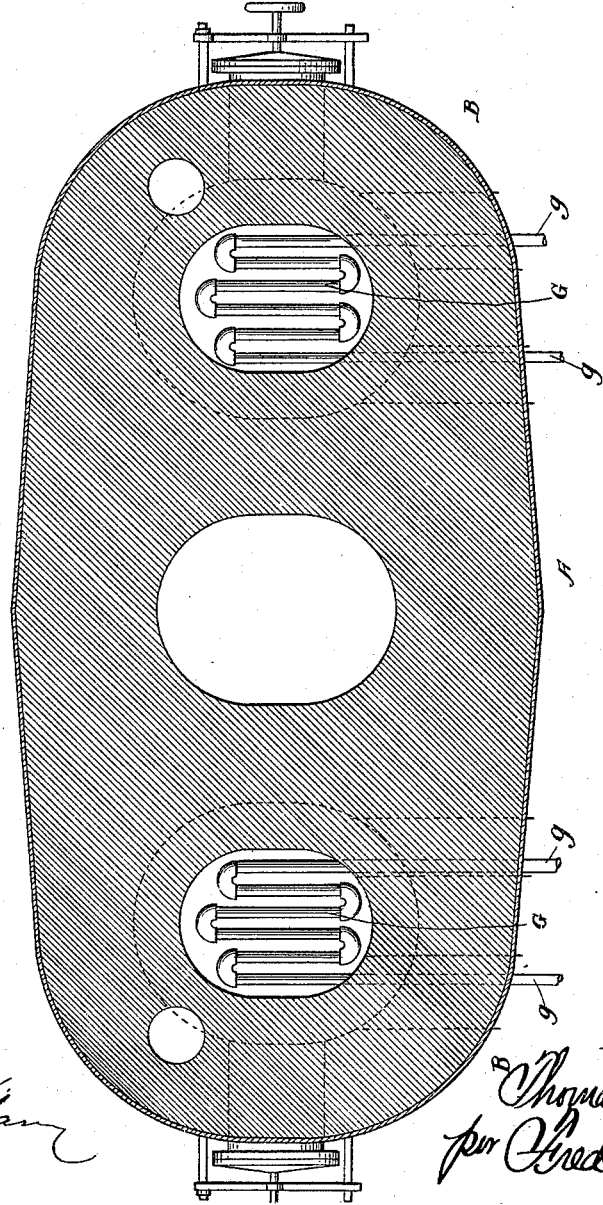
Witnesses,
Chas. W. Parker
B. C. Tiffany
Inventor,
Thomas Hennessy
per Fred E. Tasker
Atty.

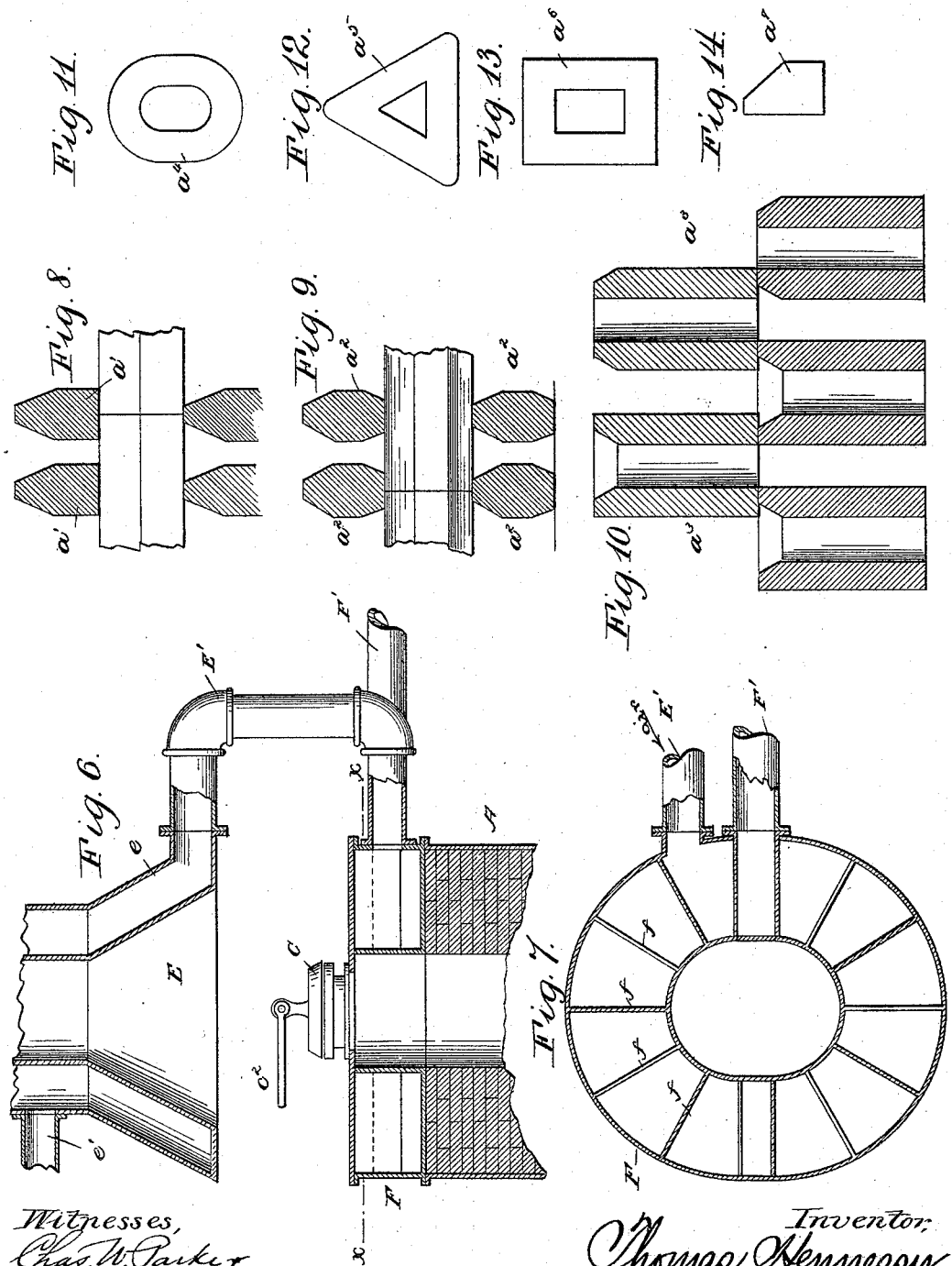

UNITED STATES PATENT OFFICE.

THOMAS HENNESSY, OF GRAND FORKS, NORTH DAKOTA, ASSIGNOR TO THE AMERICAN INCANDESCENT GAS COMPANY, OF KANSAS CITY, MISSOURI.

GAS-GENERATOR.

SPECIFICATION forming part of Letters Patent No. 573,183, dated December 15, 1896.

Application filed April 6, 1895. Serial No. 544,805. (No model.)

*To all whom it may concern:*

Be it known that I, THOMAS HENNESSY, a citizen of the United States, residing at Grand Forks, in the county of Grand Forks and State of North Dakota, have invented certain new and useful Improvements in Gas-Generators for Bituminous and Anthracite Coal or Coke; and I do hereby declare the following to be a full, clear, and exact description of the invention, such as will enable others skilled in the art to which it appertains to make and use the same.

This invention relates to an improved duplex generator and carbureter for making water-gas and other similar products from bituminous or anthracite coal.

The object of the invention is to enable these products to be made in as simple a manner as possible and with the expenditure of the minimum amount of coal; also, to improve the character of the resulting gas product.

Other manifold advantages will appear as we proceed in the course of the description of the construction and operation of the apparatus.

The invention therefore consists in the construction, arrangement, and combination of parts, substantially as will be hereinafter described and claimed.

Figure 1:
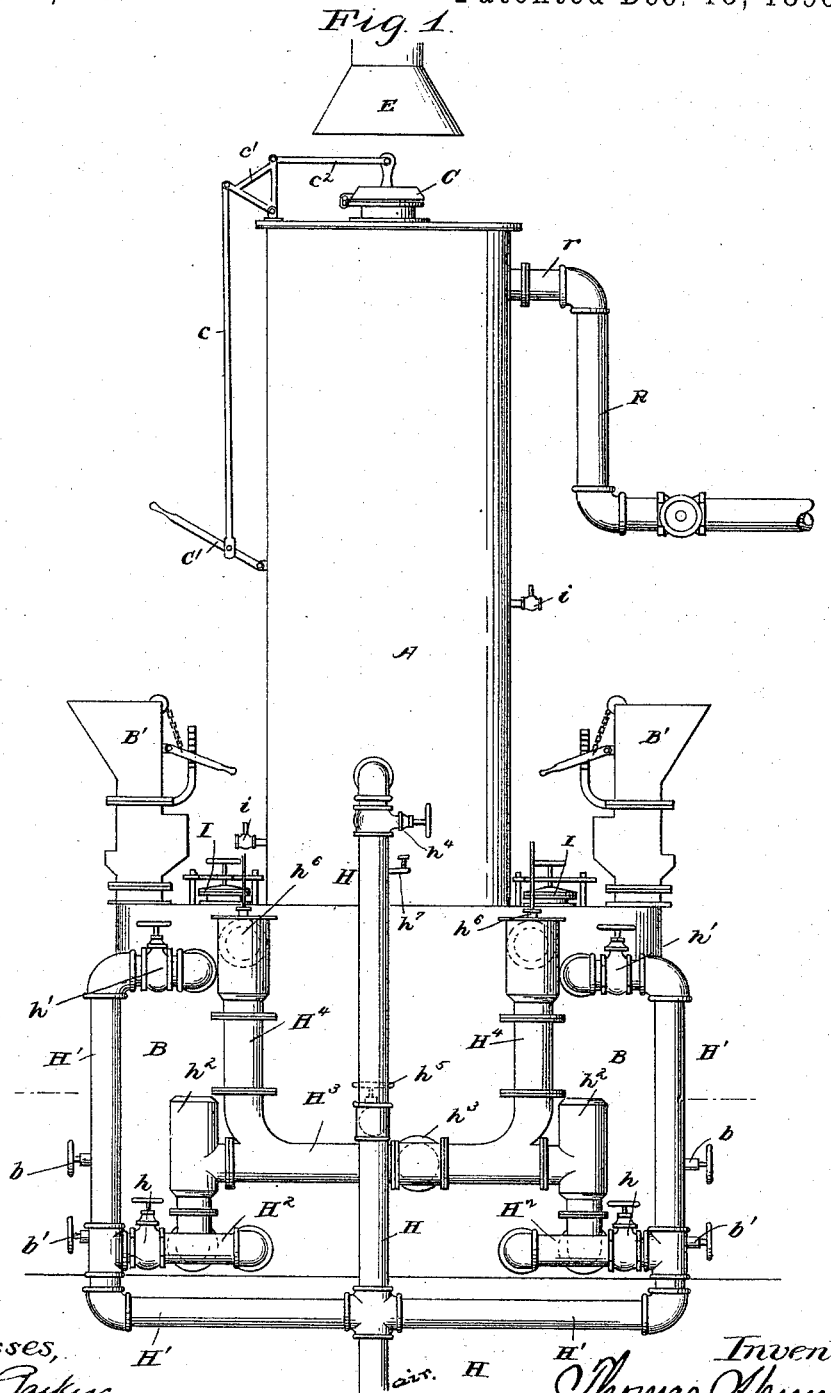
Figure 2:
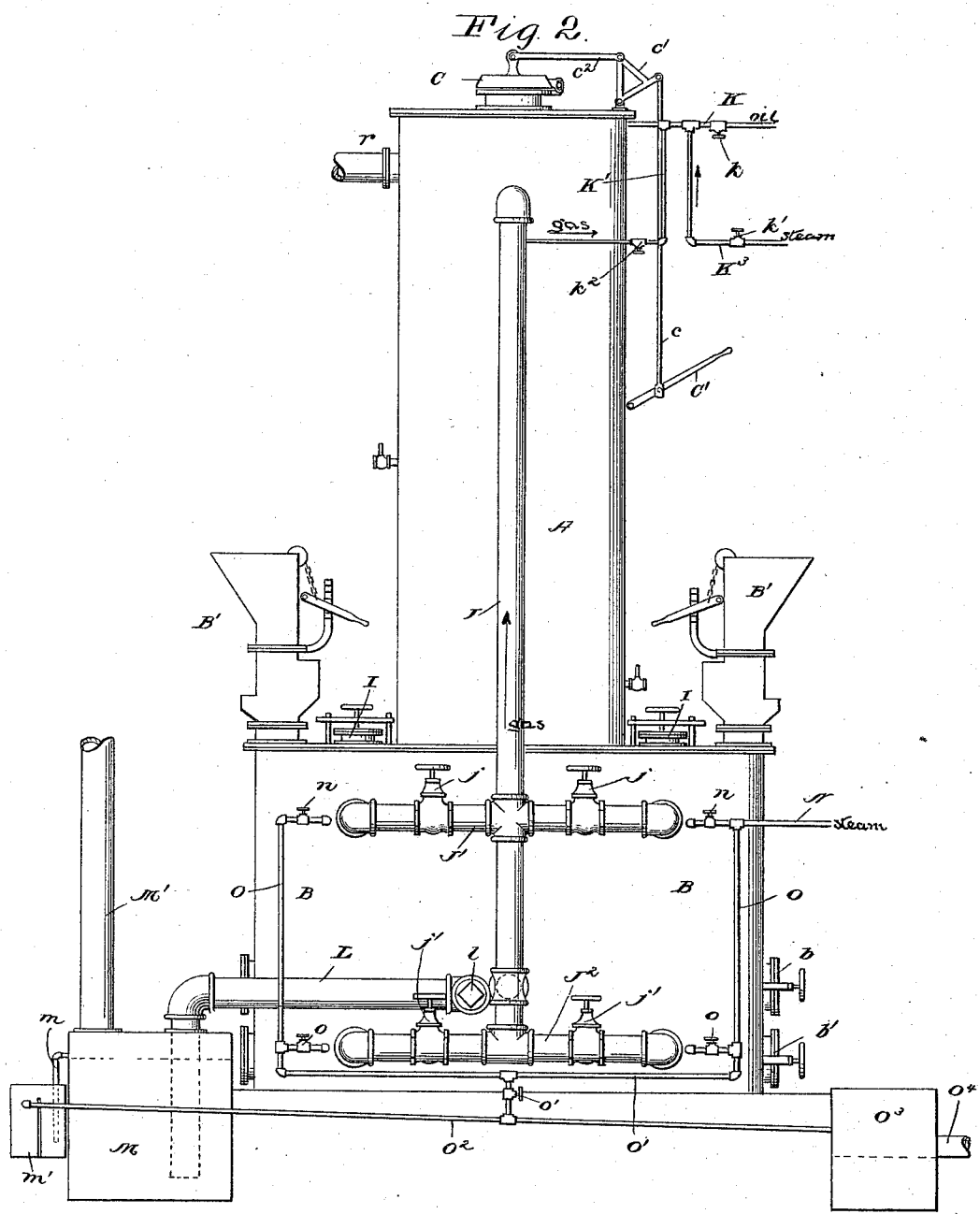
Figure 3:
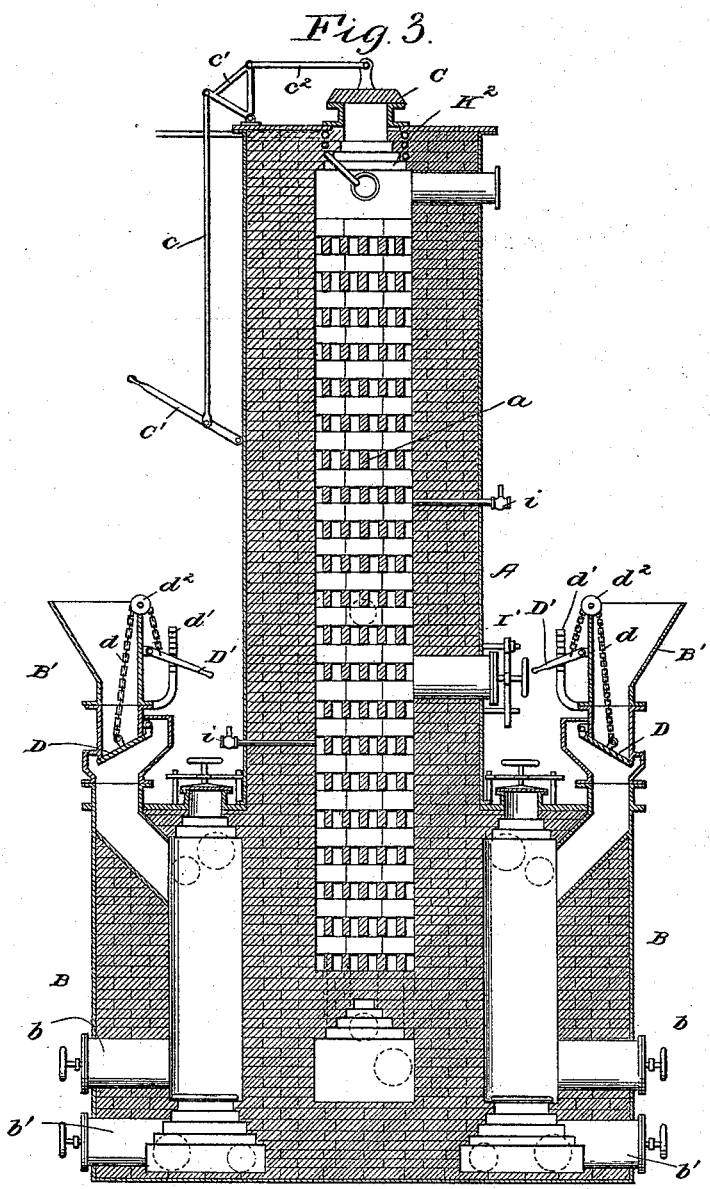

In the accompanying drawings, illustrating my invention, Figure 1 is a front elevation of my improved gas making and carbureting apparatus. Fig. 2 is a rear elevation of the same. Fig. 3 is a vertical section of the complete apparatus. Fig. 4 is a horizontal section taken through the generators and the superheater. Fig. 5 is an enlarged detail side elevation of an improved part of the apparatus. Fig. 6 is a sectional view of the upper end of the superheater and the air-heating hood mounted above the latter. Fig. 7 is a horizontal section on the line $x\ x$ of Fig. 6. Figs. 8, 9, 10, 11, 12, 13, and 14 represent different shapes of the checker-bricks which are used in the superheater.

Similar letters of reference designate corresponding parts throughout all the different figures of the drawings.

In the construction of my improved apparatus I first build two or more generators and an interposed superheater, the same being constructed of bricks or other suitable masonry and made in any desired form and after any preferred plan of arrangement. I denominate my apparatus a "duplex" apparatus, because I preferably have two generators and a single superheater, which latter is situated between the generators.

A designates the superheater, and B B the two generators. These generators are adapted to receive the bituminous or anthracite coal and permit it to be burned therein, so that the products of combustion may pass out into the superheater and there be operated upon by the secondary air and by the water-gas and other instrumentalities for the purpose of making the complete fixed gas which is the finished product of the apparatus. The generators B are in height comparatively small in proportion to the superheater A, but of course the relative proportion of these parts of the apparatus may be changed, if desired.

In the drawings I have represented the superheater A as a somewhat tall tower-like structure having a central arrangement of checker-brick $a$ extending from the bottom to the top, in order to provide a circuitous upward passage for the products of combustion after they leave the generators and for the air which passes through the generators. At the top of the superheater A there is a valve C, which covers the central opening in said top and is operated in opening and closing by means of a lever C', pivoted to the external face of the wall of the superheater A at a suitable point thereon. This lever-handle C' connects by a link $c$ with a pivoted-frame $c'$, which in turn connects by a link $c^2$ with the valve C. By manipulating the handle C', therefore, the valve C may be opened and closed at pleasure.

At the top of each of the generators B there is a chute or hopper B'. These hoppers have movable bottoms or valves D, to which are attached chains $d$, which run over pulleys $d^2$ and are attached to levers D', pivoted on the outside of the hoppers B' and adapted to engage the teeth of the arms $d'$, in order that these levers D' may be held in any desired position and that consequently the chute-bottoms D may be, when desired, held closed and also may be readily opened when the operator wishes to discharge the fuel contents of these hoppers B'.

It will be especially observed that the hoppers B' are not situated directly above the central compartments of the generators B, but are placed to one side, as shown in Fig. 3, and they communicate with these central compartments through the diagonal or inclined passages, as shown. The hoppers B' are constructed to contain, if desired, a charge of coal sufficient to fill the generators. These hoppers will be found very convenient in order to enable the operator to fill the generators with fuel without himself being exposed to the intense heat within said generators. The plan of operation will obviously be to fill the hoppers, and then, whenever the fuel within the generators needs replenishing, he can, by manipulating the levers D', cause the valves D to open and the contents of the hoppers to be discharged down the diagonal passages into the generators.

At the base of the generators are placed grates, which may be of any desired style. In Fig. 4 I have shown the pipe-constructed grates G G, which will be found to provide a useful form, they being made after the manner of an ordinary water-back and being filled with water, which circulates therethrough, so as to be heated in order to permit it to be used for heating and other purposes. I will refer to this grate feature at more length hereinafter.

Referring to the front elevational view of the apparatus delineated in Fig. 1, it will be seen that an extensive arrangement of air-pipes is necessary to properly conduct the air and other products through the apparatus. H denotes a pipe, conduit, or passage which leads from some suitable source of air supply and runs to the apparatus, being attached to the superheater at a point about midway of its height, where it is provided with a valve $h^4$, which will control the passage of air from the pipe H into the superheater at that point, and the pipe H is also provided with another connection with the superheater, near the base of the latter, which is controlled by a pipe $h^5$, all as represented in Fig. 1.

At the end of the pipe H distant from the apparatus a blower may, if desired, be connected for the purpose of forcing air through said pipe into the apparatus.

Pipe H, as shown in Fig. 1, connects with a cross-pipe H', which leads to the upper portion of each of the generators B, the same being provided with valves $h'$ $h'$, which control the outlet of air from pipe H' into the generators. Furthermore, these pipes H' are provided with branch pipes $H^2$, which enter the generators B near their lower ends, and said pipes $H^2$ are provided with valves $h$, which control the passage of air from the pipes H' into the pipes $H^2$.

By referring to Fig. 1, a still further arrangement of pipes in connection with the generators and superheater will be observed, the same consisting of a horizontal pipe $H^3$, having at each of its ends a combustion-valve $h^2$, which controls short inlet branches which lead to the generators B near the bottom ends thereof and at points closely contiguous to where the pipes $H^2$ enter the generators. The horizontal pipe $H^3$ communicates with the superheater near the lower end thereof by means of a valve $h^3$, which is situated closely contiguous to the valve $h^5$, already mentioned; also, the horizontal pipe $H^3$ communicates with the vertical branch pipes $H^4$ $H^4$, extending upwardly to points near the upper end of the generators B, where they communicate with the interior of said generators by means of the valves $h^6$ $h^6$, said valves $h^6$ being situated near the points where the valves $h'$ are located.

It will be seen that the two generators have air-pipes similarly arranged in connection therewith, and hence it will be understood that they operate in substantially the same way. One of the generators may, if desired, be used alone, or they may be used together. A description of the operation of one generator will obviously make clear the operation of both.

Suppose now that we are using a blower at the distant end of the air-supply pipe H for the purpose of forcing air to the generators and the superheater. Then the operation will be substantially as follows: The first thing which the operator will do will be to open the valve C by pulling down upon the lever-handle C'. If now the generator or generators is to be heated by an upward blast and we are to carry the products of combustion into the superheater in an upward course, all valves, doors, and other parts will be closed and the generators charged with coal. After the blower has been set in motion the valve or gate $h$ and the combustion-valve $h^6$ will be opened. The air passing through the pipe H and the pipe H' will now pass by the valve $h$ and enter generator B, through the pipe $H^2$, at a point below the fire, and the result of this will be to drive the products of combustion out of the upper part of the generator through the combustion-valve $h^6$, which we have just opened, then downwardly through the pipe $H^4$ into the pipe $H^3$ and through the valve $h^3$ into the superheater at the lower portion thereof. As the air-blast continues through the generator for some length of time, the products of combustion will be carried on up through the superheater, passing in a circuitous course along through the checker-brick and out through and past the top valve C, which, as we have already seen, was opened at the beginning of the operation. As I have already stated, this operation can be carried on either with one generator or with both generators, at the pleasure or necessity of the operator, by properly manipulating the necessary gates or valves. As this operation continues the superheater will be heated to a certain temperature that will ignite the carbonic oxid and other gases whenever secondary air shall be admitted into the superheater. Therefore, for the purpose of accomplishing this ignition, we may proceed to admit secondary air in the manner to be now explained.

At the upper end of the superheater is an air-heating hood E, which is supported in some suitable manner directly above the valve C. This hood E has a hollow wall $e$, which is entered on one side by a pipe $e'$, which conveys cold air thereto from the blower or other suitable source. At the other side of the hollow wall $e$ a pipe E' leads therefrom, as shown in Fig. 6, and enters a chamber F in the upper end of the superheater A, said chamber being of an annular form and surrounding the central passage in said superheater. The escaping ignited gases from the cupola or upper end of the superheater will heat the hood E and consequently the air contained within its hollow walls to a very high temperature, and this hot air will pass from the hood through the pipe E' into the chamber F. Chamber F is provided with a series of vertical radial walls $f$, which do not extend entirely from the top to the bottom of the chamber, but are arranged in alternate fashion, half of them being secured to the upper side of the chamber and the other half to the lower side, as shown in Figs. 6 and 7. Therefore the path of the air which travels through the annular chamber F is greatly increased, because it is made to pass up and down through all these compartments formed by the alternate division-plates, and consequently the air will be more thoroughly heated by being thus caused to remain longer in the chamber F. After the air has thus passed around through the entire length of the heating-chamber F it will enter the outlet-pipe F' and be conducted downwardly to enter the superheater. The pipe F' is preferably attached at some suitable point to the pipe H, either at top or bottom of the same, as may be required. In this way hot air is supplied to the pipe H. Now in order to ignite the products of combustion within the superheater, as before mentioned, by the introduction of secondary air the operator will proceed to open the valve $h^5$, which, by referring to Fig. 1, will be remembered as the valve located at the point where the pipe H connects with the lower end of the superheater, and through this valve the proper amount of secondary heated air will be supplied to the superheater. Particular care must be taken to admit only such a necessary and proper amount as will give the best results in igniting the products of combustion in the superheater. If it is found necessary to have more hot air supplied to the superheater at a point farther up in the same, the valve $h^4$, which, as will be remembered, is located at the point where the pipe H connects with the central portion of the superheater, may be opened and more secondary air admitted to the superheater, which will distribute itself evenly throughout the latter, and in this way a more complete ignition of the combustion products can be accomplished.

The blower will be kept in motion until, through the method just explained, the checker-bricks within the superheater are heated to the temperature desired, which will cause them to assume a bright orange color and to be at a temperature of about 2,190° Fahrenheit, and this can be easily observed by looking through the sight-cocks $i\,i$ on the sides of the superheater A. The proper heat will now have been obtained in the superheater, and the coals in the generator or generators being now heated to a state of incandescence the blower may be slowed down in its motion and the valves $h$ and $h^6$ will be closed and the cock $h^7$ slightly opened. This cock $h^7$ will act as a relief for the blower when the latter has been slowed down. With the parts in the condition as just stated we may now proceed to make gas. First we close the top valve C of the superheater and then open the valves $j'$ in the horizontal pipe $J^2$, which is situated near the base of the apparatus, as illustrated in Fig. 2. Fig. 2 is a rear view of the apparatus, and therein is shown an arrangement of pipes or conduits differing quite materially from the arrangement shown in Fig. 1 and comprising, essentially, a vertical pipe J, extending from near the top of the superheater to near the bottom of the same, at which bottom point it connects with a horizontal pipe $J^2$, and said pipe J also connects with a horizontal pipe J' at a point near the top of the generators. Other pipes for conveying steam, oil, &c., from different parts of the apparatus are shown in this view and will be explained during my further explanation of the operation of the apparatus.

The valve $j'$ communicates with the under side of the grate of the generator B. When, therefore, the valve $j'$ is open, there will be communication established between the grate of the generator and the top of the superheater through the pipes $J^2$ and J.

N denotes a pipe leading from the steam-boiler or some other suitable source of steam supply and entering the top of the generator B. At this point it is provided with a valve $n$. In this way steam can be admitted above the coals within the generator and allowed to pass downward through the same, thereby liberating the hydrogen and passing through the generator-grate out into the pipe $J^2$, through the valve $j'$, and upwardly through the vertical pipe J into the superheater near the upper end thereof. When the steam is turned on through the valve $n$, therefore, a decomposition will take place and hydrogen will be conveyed into the superheater. The carbureting process can now be proceeded with by the admission of such oils as are ordinarily used for the purpose of making gas.

K denotes an oil-pipe leading to an oil-pump, said pipe being provided with a valve $k$. I use an oil-pump because I wish to drive oil into the superheater under as high a pressure as possible, the valve $k$ being for the purpose of controlling the amount of oil which is delivered into the superheater. The pipe K connects at the upper end of the superheater with a vaporizer, consisting of a coiled pipe $K^2$, fixed in the brickwork at the extreme top of the superheater just below the valve C. This vaporizer may be formed with as many coils as are desired, and it is located on the top of the superheater, so that it may be heated by the ignited gases passing out through the top of the latter from the radiation of the heated brickwork. A pipe $K^3$, leading from the steam-boiler or some other suitable source of steam supply, connects directly with the oil-pipe K, said pipe $K^3$ being provided with a valve $k'$.

Pipe K' connects the water-gas pipe J with the oil-pipe K, and this pipe K' is provided with a valve $k^2$. In order to further convert the oil and vaporize it as much as possible before it enters the superheater, we open the valve $k^2$ in the pipe K', which is connected to the water-gas pipe J, and allow a volume of water-gas to pass through the pipe at a temperature of about 1,800° or 2,000° Fahrenheit, and this water-gas will enter the oil-pipe K and mingle with the oil at that point, which oil is at a temperature of about 70°, and this contact of the oil at 70° with the gas at 2,000° will of course immediately raise the temperature of the oil to a very high degree, and both gas and oil passing in and through the vaporizer will be discharged into the superheater in a gaseous state instead of in a liquid form, thereby greatly assisting in the carbonization of the water-gas.

Ordinarily steam is used for the purpose of carrying oil into the superheater or generator to atomize the same and assist in the conversion of the oil into gas. In my present invention of course steam may be used, if desired, for this purpose; but I consider it an essential feature, and I lay great stress in my claims to the invention of the use of water-gas in carrying the oil into the superheater and in effectually vaporizing or atomizing the same for the purpose in view. Steam of course has only a temperature of 212° Fahrenheit and could not raise the temperature of the oil above that point and would really have a cooling effect upon the vapor on passing through the same. Consequently with the use of steam the oil would not enter the superheater at a higher temperature than 212° Fahrenheit, or possibly 220° Fahrenheit, whereas if the oil enters with the water-gas at a temperature of 2,000° Fahrenheit and passes through a heated vaporizer, the gas having no cooling effect upon the same as steam would have, as before stated, then the oil will be in a gaseous state when it enters the superheater and the very best results can be accomplished. As the combined oil and water-gas pass down together through the checker-brick within the superheater they will eventually reach the outlet-pipe L, and by the time the gas reaches this point it will have been thoroughly carbureted by coming into contact with the highly-heated brickwork and thereby being made a thoroughly fixed carbureted water-gas. It will pass out from the heater through this pipe L and enter a water seal M, which is partly filled with water for the purpose of safety to the generator. The gas will then pass away over the seal M, through the pipe M', to the condenser in the usual way. $m$ denotes an overflow-pipe for the water seal M, said pipe $m$ discharging into a tank $m'$. A pipe $O^2$ leads from the tank $m'$ to a catch-basin $O^3$, from which proceeds a pipe $O^4$, that provides an overflow to the sewer.

Thus far in my description of the operation of my apparatus I have been describing its working with an upward blast of air. I will now briefly describe its operation with a downward blast.

We will suppose now that the valve $k$ is closed and the oil supply shut off. We will let the steam pass through the generator in order that the water-gas may take up all the carbon that is in the superheater, this taking only two or three minutes, and then the steam will be shut off by closing the valve $n$. Top valve C will be opened. The valve $k^2$ will be closed and the valve $j'$ will also be closed. I will now open valve $h'$ in the pipe H' near the top of the generator B, and also I will open the combustion-valve $h^2$. Now if the blower be started and the relief-cock $h^7$ be closed, then the heated air passing through the pipe H will enter the pipe H' and enter the generator at the top thereof through the valve $h'$ at a point above the coal, and the air will therefore pass down through the coals and drive the products of combustion out through the valve $h^2$ into the pipe $H^3$ and through the valve $h^3$ into the bottom of the superheater, and this operation will continue until the superheater has again been sufficiently heated to make gas in the same manner as before described. Now if we let on the steam we will permit it to enter the generator at the bottom thereof through the valve $o$ instead of through the valve $n$ at the top, as before, so that the passage of the steam through the generator will now be upward instead of downward, and the water-gas will pass out of the generater through the valve $j$ into the pipe J' and thence into the pipe J instead of passing out through the valve $j'$ into the pipe $J^2$. The operation of admitting the oil through pipe K and of the supplying of the water-gas through pipe K' to said oil, so as to vaporize and atomize the same, will proceed as before.

Although the description of the operation has been given with reference to an upward or downward blast in the right-hand generator, yet it will be understood that the other generator can be operated in precisely the same manner, either in connection with the right-hand generator or separately therefrom, that is to say, either one or both generators may be used at pleasure; also, I have explained the operation of the apparatus in connection with the blower for creating a forced draft of air. It may be used in connection with the exhauster, and the blower be therefore dispensed with. When the exhauster is employed, the pipe R, which connects to the upper end of the superheater, will be extended to the exhauster. In using the apparatus with the exhauster the top valve C will be closed. The valve S (shown in Fig. 5) will be opened to admit air at the top of the generator. The products of combustion will now be drawn from the generator into the superheater through the combustion-valve $h^2$, whence they will enter the pipe $H^3$, and go through the valve $h^3$ into the superheater. Care must be taken that the proper amount of air is conducted through the valve S, so that ignition may not take place at the base of the generator before the products of combustion enter the superheater. In order to obviate any such disadvantageous result as this would be, the steam-supply cock at the bottom of the generator, namely, the valve $o$ in Fig. 2, may be opened and the ignition of gases at that point be prevented. A check-valve S' is placed on the mouth of the pipe $S^2$, in which pipe the valve S is situated, so that any back pressure from the generator may operate to close this valve. Furthermore, a valve will be placed in the pipe H to shut off the blower from the secondary-air supply valves and pipes $H^4$ and $H^5$, said secondary supply-pipe being now under operation by the exhauster. Furthermore, in the rearrangement of parts for the purpose of enabling an exhauster to serve in lieu of a blower, the vertical pipe H, as shown in Fig. 1, will be continued up to the air-heating appliance at the top of the superheater and supplied with a valve to control the same. The pipe which constitutes the extension of the pipe H to the top of the superheater will be connected to said pipe H at some suitable point between the valves $h^4$ and $h^5$. Secondary air of course has to be admitted into the superheater for the purpose of causing a combustion therein, and in order that this may be accomplished the main valve upon the pipe leading from the air-heating appliance will be opened, as also the valves $h^4$ and $h^5$—either one or both, if deemed necessary—and the secondary heated air will be conducted into the superheater for the purpose of igniting the gases therein, as before explained. The part of the gases which is not ignited or consumed in the superheater is passed out through the pipe R, as before explained, to the exhauster, and from there discharged, as may be desired.

In order to stop any possibility of the gases igniting when they are leaving the superheater and passing through the pipe R to the exhauster, I may employ a jet of exhaust-steam, which can be introduced into the exhauster-pipe R at some suitable point, for instance, the point $r$. By the use of such a jet of exhaust-steam any ignition from the superheater will be effectually overcome.

On the top of each of the generators is a cover or door I for the purpose of permitting easy access to the interior of the generators to clean out the same or to remove clinkers or to loosen up the fire when found necessary. The generators may be charged with fuel through these doors, if desired, instead of supplying it through the valve-provided hoppers. The doors $b$ $b'$ at the base of the generators are for the purpose of allowing entrance to the fire-box and ash-pit to break and remove clinkers and clean out the fires and extract the ashes from the ash-box and perform such other services as may be necessary at the base of the generator.

At one side of the superheater is a door (designated by the reference-letter I') which is for the purpose of enabling any deposit which may accumulate within the superheater to be thoroughly cleaned out and removed.

When it is desired to clean the base of the superheater, the plug-valves $l$ (see Fig. 2) and $h^3$ (see Fig. 1) can easily be taken out. The tubular grates G G in the bottom of the generators, (see Fig. 4,) which have already been partly described, are preferably constructed of extra heavy wrought-iron pipe in the form of a water-back, the object of making the grates in this manner being to utilize the waste heat for the purpose of heating the rooms or offices in the works by means of a hot-water circulation. The pipes $g$ $g$, which lead away from and toward the two grates G G, as shown in Fig. 4, can be passed through the various rooms of the building, and by means thereof these rooms can be heated. If desired, a large tank can be placed at the highest point in the generating-room, the same being supplied with water through a ball-cock if there are waterworks in the town, and if not by means of a pump operating in connection with a well or cistern. If the ball-cock is used, a pipe may be slipped over the nozzle to conduct the water to the bottom of the tank in order to prevent the coal from mingling with the hot water. Both connections of the water-back are extended to this tank, one being allowed to project two or three inches higher in the tank than the other. This will be called the "hot-water" or "circulating" pipe, the cold water which is at the bottom passing downwardly through the pipe and through the water-back, where it is heated and whence it returns and ascends to the tank, whereby circulation is kept up continuously. In the winter season two cocks, if desired, may be placed upon the pipe, which ascends to the tank in order to drive the circulation through the radiators or coils desired to be heated throughout the building. The cocks in the circulating-pipes from the tank are just opened sufficiently to allow for pressure and expansion during the summer season when the building does not require much heat or none at all.

Referring now to Figs. 8, 9, 10, 11, 12, 13, and 14, I have represented several different styles of checker-bricks which are employed for the purpose of lining the superheater. These styles are given here simply by way of example, and I do not intend to be confined thereto, although they will be found as possessing many excellencies for the use in view. A superheater is ordinarily lined with checker-brick, as shown at $a$ in Fig. 3, for the purpose of carbureting water-gas. These bricks (marked $a$) are arranged in the cupola or superheater, as shown, said bricks being of the usual size and being ordinarily laid upon the edge in checker fashion, there being spaces between the bricks all the way up from the base to the top of the cupola, through which space the gases and products of combustion pass, and during this passage of said products the flat faces of the bricks will become covered with carbon deposits, ashes, and other burned products which will accumulate within the superheater, the deposit on the top of these bricks sometimes accumulating to the depth of from one to one and a half inches, thereby rendering the bricks a non-conductor of heat and also retarding the fixing of the oil with water-gas and causing a much longer time to be consumed in heating up the bricks than would be necessary if these accumulations of undesired products could be avoided. Again, it will be obvious that when these deposits are allowed to accumulate there will not be more than half the surface of the bricks exposed to the heated gases, and on that account a greater portion of the bricks must be heated by radiation instead of coming in contact with the ignited gases. Hence it becomes very important to devise means for avoiding the soot and other deposits, and I therefore have adopted the idea of shaping the bricks in one or the other of the styles shown in Figs. 8 to 14.

In Fig. 8 the bricks $a'$ are beveled from the top at both sides and made square at the bottom, the object being to leave little or no square surface on the top which can receive the ashes or carbon which might be deposited thereon, while the base or bottom of the brick, being left square and only resting on the tapered top of the bricks of the next series, leaves more surface to be exposed to the gases, although scarcely any surface on the top for the accumulation of carbon, as before stated.

In Fig. 9 the bricks $a^2$ are tapered to a considerable degree upon the top and very slightly on the bottom, this tapering being for the purpose of exposing a larger surface to the gases, as well as enabling the bricks to be placed closely together.

In Fig. 10 the bricks $a^3$ are made in the form of hollow tiles having a thickness of one or more inches and tapered at the top either inwardly or outwardly, as shown, so that no accumulation or deposit can be made upon the upper end of the tiles while they are located within the superheater.

In Fig. 11 the brick $a^4$ is in the form of an oval-shaped hollow tile, which is also tapered at the top for the same purpose as before stated.

In Fig. 12 the brick $a^5$ is a hollow tile of triangular form.

In Fig. 13 the brick $a^6$ is a hollow tile of square form, and in Fig. 14 the brick $a^7$ is a solid brick having a sloping or beveled face on one side. These bricks $a^5$, $a^6$, and $a^7$ may all be tapered upon the top or the bottom, as may be preferred, and they may be of any length and width desired. It may be also stated that a brick shaped in the form of an auger can be used for the purpose of superheating, as before stated. The particular merit possessed for the above-described bricks in their different forms, as shown and explained, is to prevent the accumulations of carbon or ashes or other non-heat-conducting matter. In a cupola or superheater where bituminous coal is used for the purpose of heating the bricks the deposit upon the latter will be much greater than where anthracite coal or coke is employed, and it would not be practical or economical to heat a superheater with bituminous coal when bricks are placed in the cupola which will retain the heavy ashy matter deposited in the use of said coal.

With the construction and arrangement of parts as I have just explained them many advantages will be found to accrue in the making of water-gas and in the process of carbureting when either bituminous or anthracite coal is employed. The placing of the superheater between the two generators is a great advantage. Being thus located between two fires, the same amount of time or fuel will not be required in heating it. It can be heated up to the desired temperature in a much shorter time than it could be if it were a separate structure placed upon the top of the generator or separated at some distance from the generator.

In the operation of the apparatus the superheater will ordinarily be heated to a temperature of about 2,200° or 2,300° Fahrenheit for the purpose of converting the vaporized oil or what is commonly called "gas-naphtha" into gas and enabling it to meet the hydrogen, which is liberated from the steam that passes through the hot coals in the generators at the point where it enters the superheater at the top with the water-gas. The arrangement of pipes, passages, and valves for conveying the primary air and the secondary air, as well as for supplying the steam and oil and other products, may be changed or varied to a considerable degree in the construction of different apparatuses for different locations and varying purposes, and I therefore reserve the liberty of so changing and rearranging these various valves and pipes as may best suit the exigencies of individual cases.

Having thus described my invention, what I claim as new, and desire to secure by Letters Patent, is—

1. In a gas generater and carbureter, the combination with the generators having fire-chambers and charging-hoppers therefor, said hoppers having diagonal passages leading to the fire-chambers thereof, of the superheater having an interior checker-brick construction, said generators and superheater formed in the same structure, an air-heating appliance supported above the superheater for heating and conveying secondary air thereto, and consisting of an annular hood having communication with an annular chamber located in the top of the superheater, air pipes or passages for conveying primary air to the generators, passages for conveying air and the products of combustion from the generator to the superheater, an oil-pipe communicating with a coil vaporizer or atomizer at the upper end of the superheater, a water-gas pipe leading from the generators to the upper end of the superheater, and a connection between said oil-pipe and water-gas pipe, substantially as set forth.

2. In a gas generator and carbureter, the combination with the generators and superheater, of a valve at the upper end of the superheater, an air-heating hood over the superheater, having communication with a heating-hood in the top of the superheater, a coiled vaporizer or atomizer disposed in the upper end of the superheater, an oil-pipe leading to said vaporizer, a water-gas pipe connected with the oil-pipe, a steam-pipe also connected with the oil-pipe, and valves for regulating said pipes, by means of which either steam or water-gas may be employed in carrying the oil into the superheater.

3. In a gas generator and carbureter, the combination with the superheater, of the air-heating appliance at the upper end thereof consisting of a hollow-walled hood supported above the superheater and an annular chamber supported on the superheater and having alternate division-plates, together with the pipe connecting the hood and the said chamber, substantially as described.

4. In a gas generator and carbureter, the combination of the generators, the intermediate superheater, the tubular grates for the generators, the charging-hoppers at the upper end of the generators, having valve-bottoms, the valve at the upper end of the superheater, the atomizing and vaporizing pipes below said valves, the air-heating appliance consisting of the hood and the annular chamber and the appropriate air-conveying passages connecting with the generators, the superheater and the upper air-heating appliance, all arranged substantially as described.

5. In a gas generator and carbureter, the combination with the generators and the superheater located between said generators, of the atomizing coil-pipes at the upper end of the superheater, the oil-pipe connected thereto, the air-conveying pipes or passages connecting with the generators, the pipes or passages for heating and conveying secondary air to the superheater and likewise having suitable valves, the steam-conveying pipes which enter the generators and convey steam thereto, which will pass through the fuel, and the hot-air pipe leading from one of the secondary-air pipes to the oil-conveying pipe, all arranged to operate, substantially as described.

6. In a gas generator and carbureter, the combination with the generators and superheater located therebetween, of the gas-conveying pipes leading from the top and bottom of the generators to the superheater, the pipes or passages for conveying primary and secondary air to the superheater, the water-heating pipe forming the grates in the generators, whereby the hot water therein may be used to heat adjoining compartments, the air-heating hood located above the superheater, a pipe connecting the hood to an annular chamber supported on the superheater and having alternate division-plates, all substantially as set forth.

7. In a gas generator and carbureter, the combination with the generators and superheater, of charging mechanism on said generators, a valve device at the upper end of the superheater, means for operating the apparatus either with an upward or downward draft of air, a heating-hood located above the superheater, a heating-chamber in the top of the superheater, connecting-pipes putting said hood, heating-chamber and superheater in communication; a vaporizer formed in the upper wall of the superheater, and means for conveying the oil thereto under fluid-pressure, all substantially as set forth.

In testimony whereof I affix my signature in presence of two witnesses.

THOMAS HENNESSY.

Witnesses:
W. T. MUNRO,
WM. H. NEWLEE.